United States Patent
Miggiano

(10) Patent No.: US 9,329,468 B2
(45) Date of Patent: May 3, 2016

(54) RETRACTABLE PROJECTION SCREEN

(71) Applicant: Robert Miggiano, Mulhouse (FR)

(72) Inventor: Robert Miggiano, Mulhouse (FR)

(73) Assignees: Robert Miggiano, Mulhouse (FR); Jean-Marc Vassards, Delemont (CH)

( * ) Notice: Subject to any disclaimer, the term of this patent is extended or adjusted under 35 U.S.C. 154(b) by 0 days.

(21) Appl. No.: 14/396,872

(22) PCT Filed: Apr. 25, 2013

(86) PCT No.: PCT/FR2013/000115
§ 371 (c)(1),
(2) Date: Oct. 24, 2014

(87) PCT Pub. No.: WO2013/160573
PCT Pub. Date: Oct. 31, 2013

(65) Prior Publication Data
US 2015/0109665 A1    Apr. 23, 2015

(30) Foreign Application Priority Data
Apr. 27, 2012   (FR) ...................................... 12 53923

(51) Int. Cl.
*G03B 21/58*    (2014.01)
*G03B 21/56*    (2006.01)

(52) U.S. Cl.
CPC ................ *G03B 21/58* (2013.01); *G03B 21/56* (2013.01); *G03B 21/565* (2013.01)

(58) Field of Classification Search
CPC .............................. G03B 21/58; G03B 21/565
USPC ......................................................... 359/461
See application file for complete search history.

(56) References Cited

U.S. PATENT DOCUMENTS

| | | | | |
|---|---|---|---|---|
| 2,699,090 A | * | 1/1955 | Underhill, Jr | 359/444 |
| 5,258,870 A | * | 11/1993 | Tai | 359/445 |
| 5,353,152 A | * | 10/1994 | Realmuto | 359/461 |

(Continued)

FOREIGN PATENT DOCUMENTS

| CN | 2837102 Y | 11/2006 |
|---|---|---|
| DE | 20 2005 007 565 U1 | 9/2005 |

(Continued)

OTHER PUBLICATIONS

International Search Report Corresponding to PCT/FR2013/000115 mailed Jun. 25, 2013.

(Continued)

*Primary Examiner* — Christopher Mahoney
(74) *Attorney, Agent, or Firm* — Davis & Bujold PLLC; Michael J. Bujold

(57) ABSTRACT

A screen device (10) having a casing (10), a projection screen (12) and a setting (13) associated with displacement mechanism (20) for modifying the visible content of the casing. The projection screen (12) and the setting (13) are combined on a unitary support sheet (14) and the displacement mechanism (20) comprise two parallel winding rollers (21, 22) about which the support sheet (14) is wound, and one of the rollers is a driven roller. Stiffening mechanism (50) is associated with the two free edges (14a) of the support sheet (14) for stiffening the free edges in the winding direction of the and to confer a perfect flatness to the sheet over its entire surface area. A guide mechanism (60) is associated with the stiffening mechanism (50) for the free edges (14a) of the support sheet (14).

17 Claims, 7 Drawing Sheets

(56) References Cited

U.S. PATENT DOCUMENTS

| | | | |
|---|---|---|---|
| 6,552,847 B2* | 4/2003 | Congard | 359/445 |
| 7,180,665 B2* | 2/2007 | Daniel et al. | 359/461 |
| 7,602,549 B2* | 10/2009 | Yamauchi | 359/449 |
| 7,777,948 B2* | 8/2010 | Chung et al. | 359/450 |
| 7,872,802 B2* | 1/2011 | Seymour | 359/461 |
| 7,889,424 B2 | 2/2011 | Suteau | |
| 7,995,273 B1* | 8/2011 | Robinson | 359/449 |
| 8,120,846 B2 | 2/2012 | Trelohan et al. | |
| 2007/0121209 A1 | 5/2007 | Liang et al. | |
| 2007/0153379 A1* | 7/2007 | Mikkelsen et al. | 359/461 |
| 2007/0285337 A1 | 12/2007 | Maddock | |
| 2008/0117506 A1* | 5/2008 | Choi | 359/449 |
| 2008/0259451 A1 | 10/2008 | Jiang | |
| 2011/0141559 A1* | 6/2011 | Kuroi | 359/461 |

FOREIGN PATENT DOCUMENTS

| | | |
|---|---|---|
| FR | 2 879 766 A1 | 6/2006 |
| FR | 2 930 652 A1 | 10/2009 |
| WO | 2004/027515 A1 | 4/2004 |

OTHER PUBLICATIONS

Written Opinion Corresponding to PCT/FR2013/000115 mailed Jun. 25, 2013.

* cited by examiner

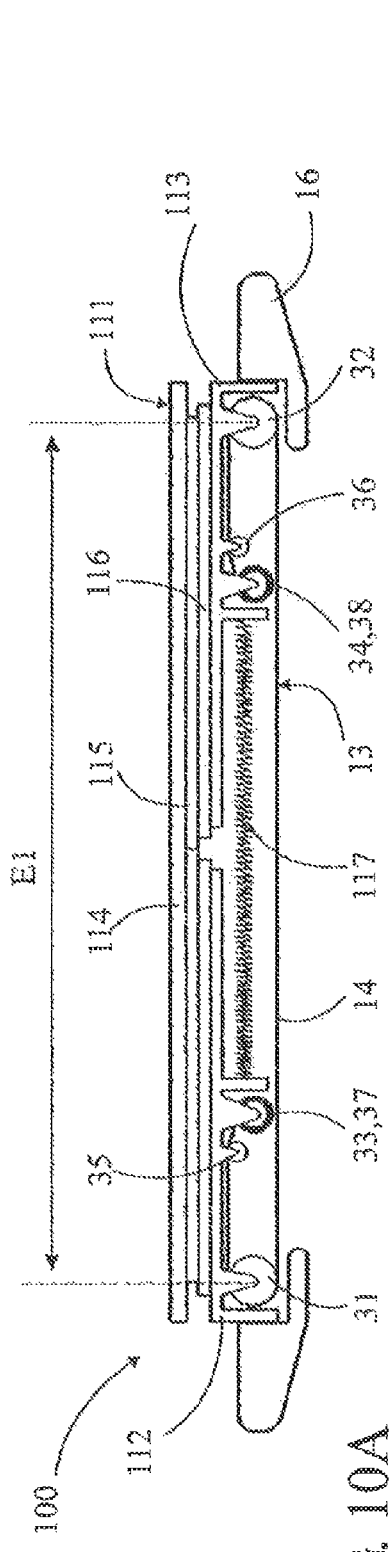
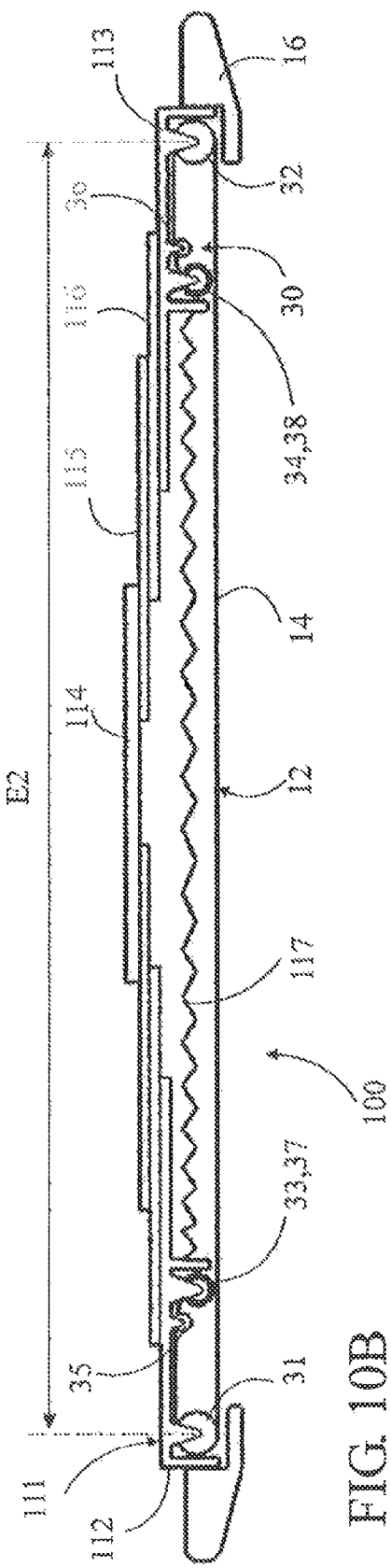
FIG. 10A
FIG. 10B

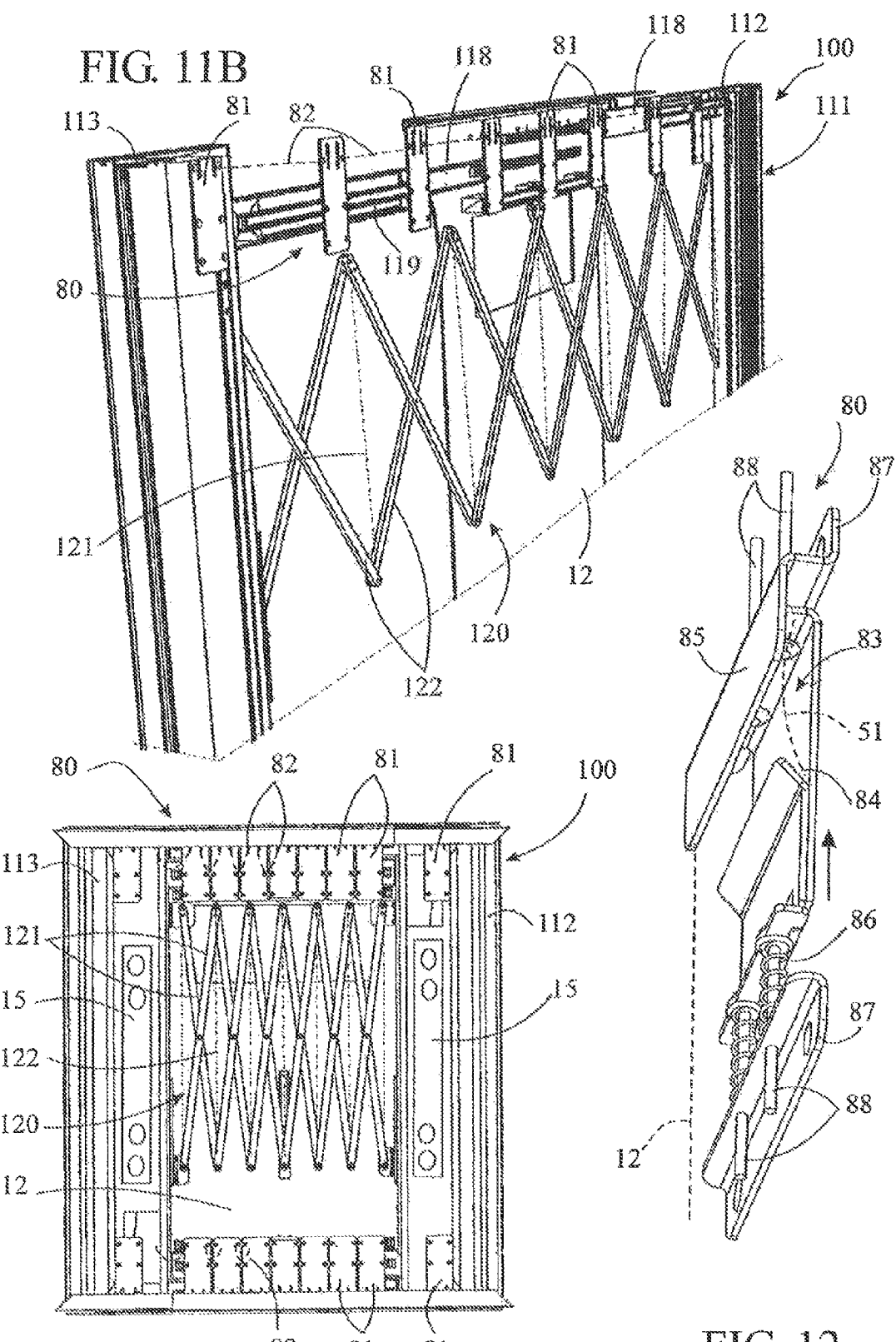

RETRACTABLE PROJECTION SCREEN

This application is a National Stage completion of PCT/FR2013/000115 filed Apr. 25, 2013, which claims priority from French patent application serial no. 12/53923 filed Apr. 27, 2012.

FIELD OF THE INVENTION

The present invention relates to a retractable projection screen device including at least one projection screen and at least one setting superimposed on said projection screen in at least one retracted position of said screen, and displacement means associated respectively with said projection screen and/or with said setting to move at least one of said projection screen or said setting with respect to the other in order to make said projection screen visible in at least one position of use of said screen, said at least one projection screen being carried by a support sheet and said displacement means including at least two parallel winding rollers whereon said support sheet winds up, at least one of said rollers being a motorized driving roller.

BACKGROUND OF THE INVENTION

The home cinema devices allow viewing a movie, a television program, Internet contents, a photo album, etc., using a video projector, on a more or less large screen, depending on the space available. This projection screen is generally mounted on a wall and occupies a large space that prohibits installing any other setting in the place of this screen. When it is not used as a projection screen, it shows a white surface, surrounded or not by a black frame, which is neither aesthetic nor pleasant to the eye in a living room. This is why some users install a cinema room in their house, intended exclusively for movie projection. However, these constraints limit the development possibilities of home cinema and hold back in particular potential users who have no specific room to dedicate to cinema.

Roll-down screens as described in publication WO 2004/027515 are known, housed or not in a casing mounted on a wall, and which are unwound on request to make a projection. This solution is not satisfactory, both in terms of picture quality, since the screen is not stretched laterally and distorts the picture, and in terms of practicality and aesthetics in a living room.

Other solutions exist to hide a projection screen on the rear side of a piece of art, a picture or any other wall setting, in order to have a discrete projection screen in a living room and to be able to convert this living room at will in a cinema room. An example is described in publication FR 2 879 766. It discloses a picture having on its back a casing containing a device with articulated arms that opens in three parts as a triptych to unfold and stretch a projection screen carried by said device, the picture being one of the sections of the triptych. This solution is not satisfactory as the fabric is folded in its retracted position, the mechanism is complex and cumbersome on the back of the picture, which in most cases imposes letting said casing into the wall, entailing additional work and expenses. Moreover, this solution is restricted to one screen size and one screen type, and does not allow considering different screen sizes according to the format of the projection, neither different reflective qualities for the screen.

Publication CN 2 837 102 Y discloses a more user-friendly solution wherein a picture includes at least one fabric wound between two parallel rollers and showing, according to its position, a decorative picture, a projection screen, or a writing board. However, this fabric cannot provide a projected image of high quality as its free ends are floating, not held and can generate distortions of the projected image.

Publication US 2007/0285337 A1 discloses a foldable or windable screen whose free edges are stiffened by means of self-supporting strips that are obligatorily curved and housed in slides added along said free screen edges, allowing the self-support of the screen in normal position of use and maintaining its flatness. However, the implementation of this solution is complex, costly and not reliable. The addition of the slides leads to extra manufacturing costs and to excess thicknesses in the free edges of the screen that can be prejudicial both to the size and to the integrity of the screen when it is wound on itself. Moreover, this solution cannot be transposed to a support sheet that circulates between two rollers as nothing is provided to prevent the fabric from shifting transversally with respect to the rollers.

SUMMARY OF THE INVENTION

The present invention aims to overcome the disadvantages mentioned above by offering a simple, reliable, cost-effective mechanical device with a reduced depth, that allows hiding a projection screen on the rear of a piece of art, a picture or similar, able to keep the projection screen stretched both in its horizontal and vertical directions, without folds, both in its different positions and during its movement, this device giving also the possibility to provide for several screen sizes and/or several interchangeable wall settings and/or several reflective qualities of the screen.

To that purpose, the invention relates to a screen device of the type stated in the preamble, characterized in that it includes moreover stiffening means associated to the two free edges of said support sheet to stiffen them at least in the winding direction of said support sheet and confer to said support sheet a perfect flatness over its entire surface and in that it also includes guide means arranged to guide the free edges of said support sheet associated with said stiffening means, In a preferred embodiment, said stiffening means include at least one strap, for example made out of metal, added on the free edges of said support sheet, said strap being rigid in its length along its longitudinal axis X and in its width along its transversal axis Y, and being flexible in its thickness so as to allow winding it on itself with said support sheet. This strap is partly fitted onto the free edges of the support sheet so that said strap has a free inside edge and a free outside edge. The free edge of said support sheet can coincide with the free outside edge of said strap.

In the preferred embodiment, the guide means include longitudinal grooves arranged to receive by sliding at least the free inside edges of the straps, these longitudinal grooves being carried by at least one support.

Said longitudinal grooves can be arranged in guides placed on said support to ensure the guidance of at least the visible section of the support sheet or to ensure the guidance of both the visible section and the retracted section of the support sheet.

If the guides are arranged on either side of said support, they can be connected two by two by means of an elastic tape arranged to balance the tension between the visible section of the support sheet and the retracted section of the support sheet, and self-center said support sheet.

The guides can also be mounted movably on supports and tensioned by return means in order to stretch said support sheet.

Said displacement means can include two winding rollers of which at least one is a motorized driving roller and said support sheet can form a closed loop around said winding rollers.

They can also include at least two winding rollers and two driving rollers, and said support sheet can then form an open loop wherein each of its ends winds up on one of the driving rollers, In this embodiment variant, said support sheet can include several projection screens with different sizes and/or different reflective qualities and/or several setting types placed one after the other.

In the preferred embodiment, the screen device includes a casing arranged to be hung on a wall or carried by a carrier structure, and to contain said displacement means and said support sheet. This casing can be specific of made of a recess arranged in said wall.

In an embodiment variant, said casing can be telescopic and include at least one bottom panel and two end panels carrying at least said winding rollers and said driving rollers, said end panels being slidably mounted with respect to said bottom panel so as to be able to move away from each other and increase the center distance of said winding rollers, as well as the dimension of the visible section of said support sheet.

According to the required dimensions, said casing can include at least one additional stage made of at least two intermediate panels located between said bottom panel and said end panels and slidably mounted with respect to each other.

In this case, at least said end panels are tensioned towards their opened position by return means that tend to move them away from each other and they are held in closed position by motors coupled to said driving rollers.

The supports of said guide means can be mounted on slides so as to follow the free edges of said support sheet during the opening and closing displacements of said telescopic casing.

The casing of said retractable screen device, whether telescopic or not, can advantageously include loudspeakers behind said support sheet, which can include micro-perforations at least in front of the loudspeakers to further sound diffusion.

BRIEF DESCRIPTION OF THE DRAWINGS

The present invention and its advantages will be better revealed in the following description of several embodiments given as non limiting examples, in reference to the drawings in appendix, in which:

FIGS. 10A and 10B are schematic top views of a first embodiment of the displacement means of the device of FIGS. 9A to 9C, respectively in closed position and in open position, FIGS. 11A and 11B are rear views of a second embodiment of the displacement means of the device of FIGS. 9A to 9C, respectively in closed position and in open position, in partial perspective views, and FIG. 12 is a perspective view of a guide means of the screen of the device of FIGS. 11A and 11B.

DETAILED DESCRIPTION OF THE PREFERRED EMBODIMENTS

Figure 1:
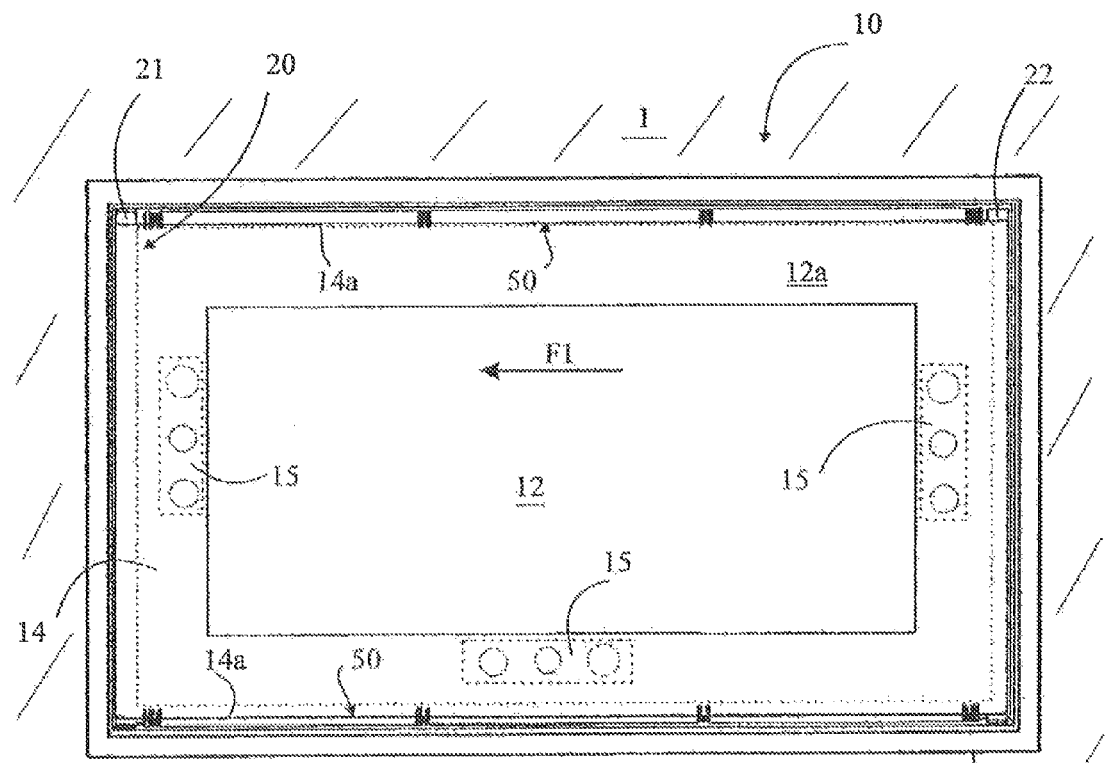
FIG. 1 is a front view of the projection screen device according to a first variant of the invention wherein the casing is fixed, the projection screen being visible and the cower frame being removed to show the inside of the device.
Figure 2:
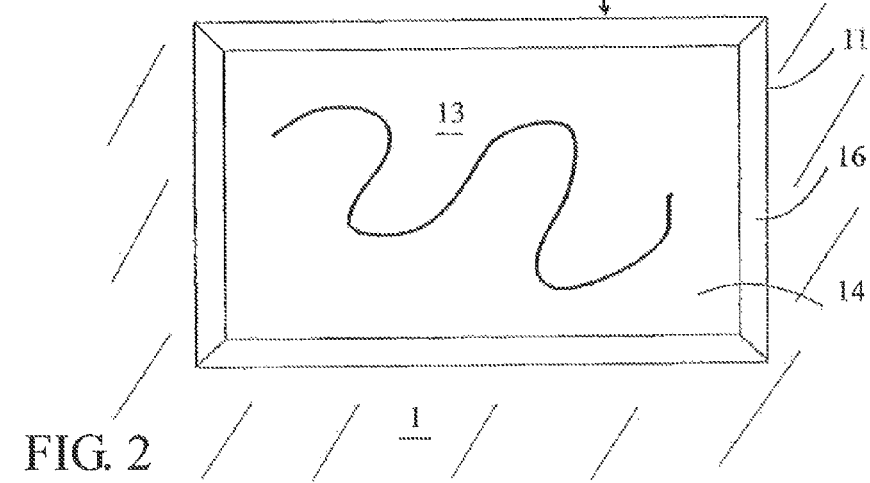
FIG. 2 is a front view of the device of FIG. 1 at a reduced scale, the wall setting being visible and the cover frame being mounted.

Referring to FIGS. 1 to 8, the retractable projection screen 10 according to the invention includes at least one casing 11 arranged to be hung on a wall 1, on a carrier structure or similar. In the represented example, this casing 11 is rectangular and the wall 1 is a wail or a partition wall. Of course, this casing 11 can be superimposed on a wall 1 or integrated in a recess arranged for this purpose in said wall 1. It can also be formed by the recess itself. This casing can also be supported by an underframe or similar resting on the floor or on any other surface, in a fixed or rolling manner. In the whole text, the expression "casing 11" includes all these various possibilities. It includes a cover frame 16 arranged around casing 11 to hide the internal mechanism. This cover frame 16 can be made of a commercially available framing or of a frame designed especially for said device, according to the desired aesthetics. This cover frame 16 can be separate or integrated and belong to a piece of art.

The screen device 10 according to the invention includes at least one projection screen 12 and at least one setting 13 superimposed and combined on a same support sheet 14, in the extension of each other. The support sheet 14 is preferably made of a flexible coated fabric allowing good reflection of a picture projected by a video projector. The projection screen 12 can be made of the raw support sheet 14 itself, of a white or light printing on support sheet 14 or by another fabric added on support sheet 14 by gluing, sewing, etc. It can be delimited or not by a more or less black, more or less wide printed edge, another setting or similar, The setting 13 can be printed on support sheet 14, directly painted on this sheet to create an original piece of art, or on another fabric added on support sheet 14 by gluing, sewing, etc. It can be a reproduction of a piece of art, an original painting or any other type of setting.

Loudspeakers 15 can be integrated in casing 11, behind support sheet 14. In this case, support sheet 14 can have micro-perforations in front of said loudspeakers 15, on the side of projection screen 12, to let the sound pass. These loudspeakers 15 are preferably flat or extra flat, to require only a reduced space in depth. Of course, device 10 according to the invention can be complemented with other accessories such as a lighting system and further equipment obvious to a person skilled in the art, according to the options offered to the user.

The screen device 10 includes displacement means 20 for moving support sheet 14 with respect to casing 11 in order to show to the user either setting 13 (cf. FIG. 2) or projection screen 12 (cf. FIG. 1) according to his choice. These displacement means 20 include at least two parallel winding rollers 21, 22, arranged in two opposite sides of casing 11 and whereon support sheet 14 winds up. In the illustrated example, winding rollers 21, 22 are vertical and provided in the right and left sides of casing 11, support sheet 14 moving horizontally. These rollers can of course be provided horizontally in the upper and lower sides of the casing, the support sheet moves then vertically. At least one of the winding rollers 21 is a driving roller that is motorized, for example with a tubular motor 23 that has the advantage of being mounted inside of the internal diameter of the roller, but any other motor or actuator may be suitable. In the illustrated example, the other winding roller 22 is mounted free in rotation and tensioned by return means 24 that allow stretching support sheet 14 in its horizontal axis of movement, ensuring a fixed center distance E between both rollers 21, 22 and therefore compensating the operating play. This return means 24 is represented by a compression coil spring arranged in a housing 25 integral with casing 11 to exert its return force on the axis of said roller 22, rotatable in said casing 11 in oblong seats that allow a slight play in the horizontal axis. Any other return means can be considered. In a non represented embodiment, this return means 24 can be replaced with another motor driving the second winding roller 22 and an electronic control of the rotary speed of both winding rollers 21 and 22.

Figure 3:
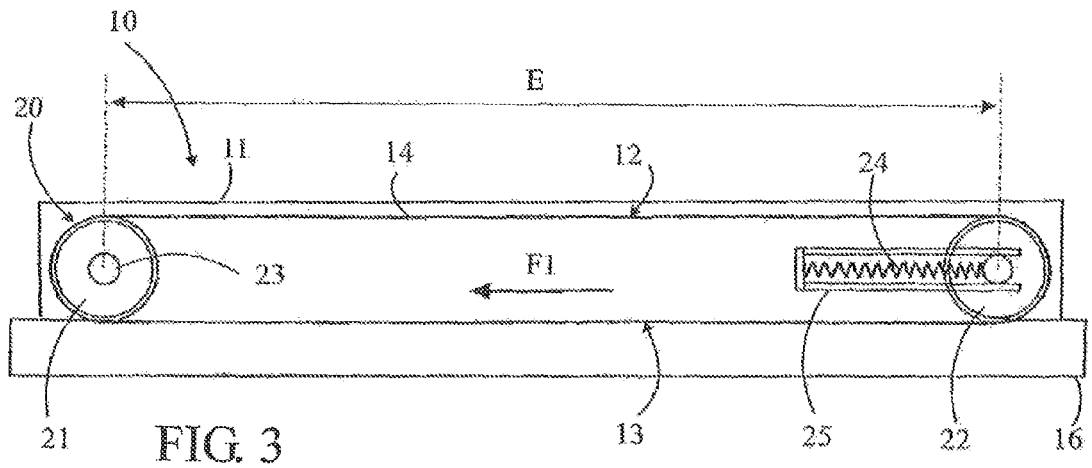
FIG. 3 is a schematic top view of the displacement means for moving the sheet carrying the projection screen and the wall setting of the device of FIGS. 1 and 2.

Referring to FIG. 3, the support sheet 14 forms a closed loop around both winding rollers 21, 22 and circulates in the same direction represented by arrow F1 or in both directions, depending on the motor type chosen. The projection screen 12 and the setting 13 provided on support sheet 14 are superimposed and located in opposition, so that, when setting 13 is located at the front side of casing 11, projection screen 12 is retracted behind setting 13 inside of casing 11, and vice-versa. At every pulse sent to motor 23, the support sheet 14 moves on a distance that allows replacing setting 13 by projection screen 12, and vice-versa, at the front side of casing 11. The motor 23 is advantageously controlled remotely by a wireless remote control or any other suitable communication means.

Figure 4:
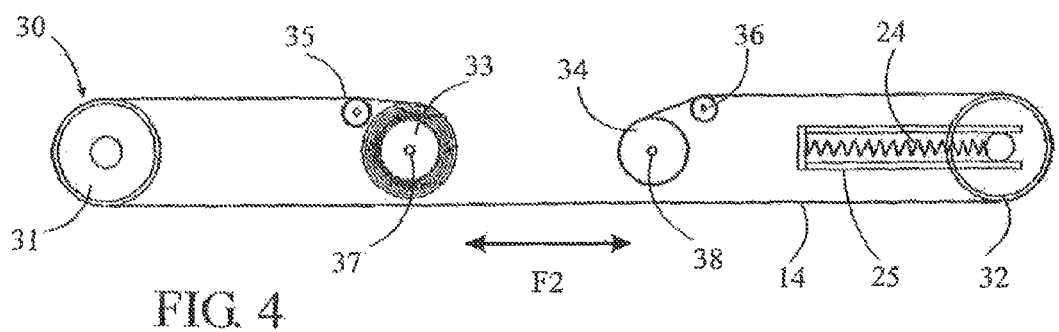
FIG. 4 is a view similar to FIG. 3 of an embodiment variant of the displacement means of FIG. 3.

FIG. 4 illustrates an embodiment variant of displacement means 30, including two parallel winding rollers 31, 32 provided in the right and left sides of casing 11 (not represented in this figure), two motorized driving rollers 33, 34 and two deflection rollers 35, 36 provided inside of casing 11, all these rollers being parallel. At least one of driving rollers 31, 32 can be tensioned or not, as in the previous example, by a return element 24, depending on the type of the motors chosen and the type of control of said motors. In this variant, support sheet 14 does not form a closed loop, but an open loop wherein each of its ends winds on one of driving rollers 33, 34 after having moved around a deflection roller 35, 36 ensuring its proper positioning whatever the thickness of the sheet wound on driving rollers 33, 34. This deflection roller 35, 36 can be optional. Support sheet 14 can therefore have a length that exceeds twice the length of casing 11 in order to offer several projection screens 12 with different sizes and/or different reflective qualities and/or different types of settings 13 placed one after the other, multiplying the possibilities of interchangeable projection screens and/or settings. The motors 37, 38, for example tubular motors, associated with driving rollers 33, 34 are synchronized to allow simultaneously unwinding support sheet 14 from one of the rollers 33 and winding it on the other roller 34 and vice-versa, according to the element to be shown on the front side of casing 11. The motors 37, 38 must be able to rotate in both directions of rotation to allow the movement of fabric 14 from left to right and from right to left, as shown by double arrow F2.

Figure 5:
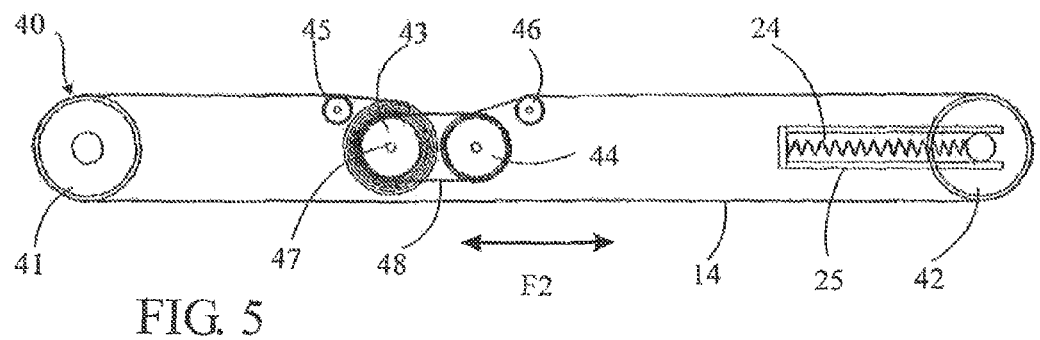
FIG. 5 is a view similar to FIG. 3 of another embodiment variant of he displacement means, which allow unwinding several projection screens.

FIG. 5 presents a technical solution slightly different from that of FIG. 4, wherein the displacement means 40 include one single motor 47. It also includes the two parallel winding rollers 41, 42 provided in the right and left sides of casing 11 (not represented in this figure), two driving rollers 43, 44 and two deflection rollers 45, 46 provided inside of casing 11. Only one of the driving rollers 43 is motorized and drives the other driving roller 44 by means of a transmission 48 using a timing belt, a chain, gears or similar, ensuring a synchronization between rollers 43, 44.

Figure 6:
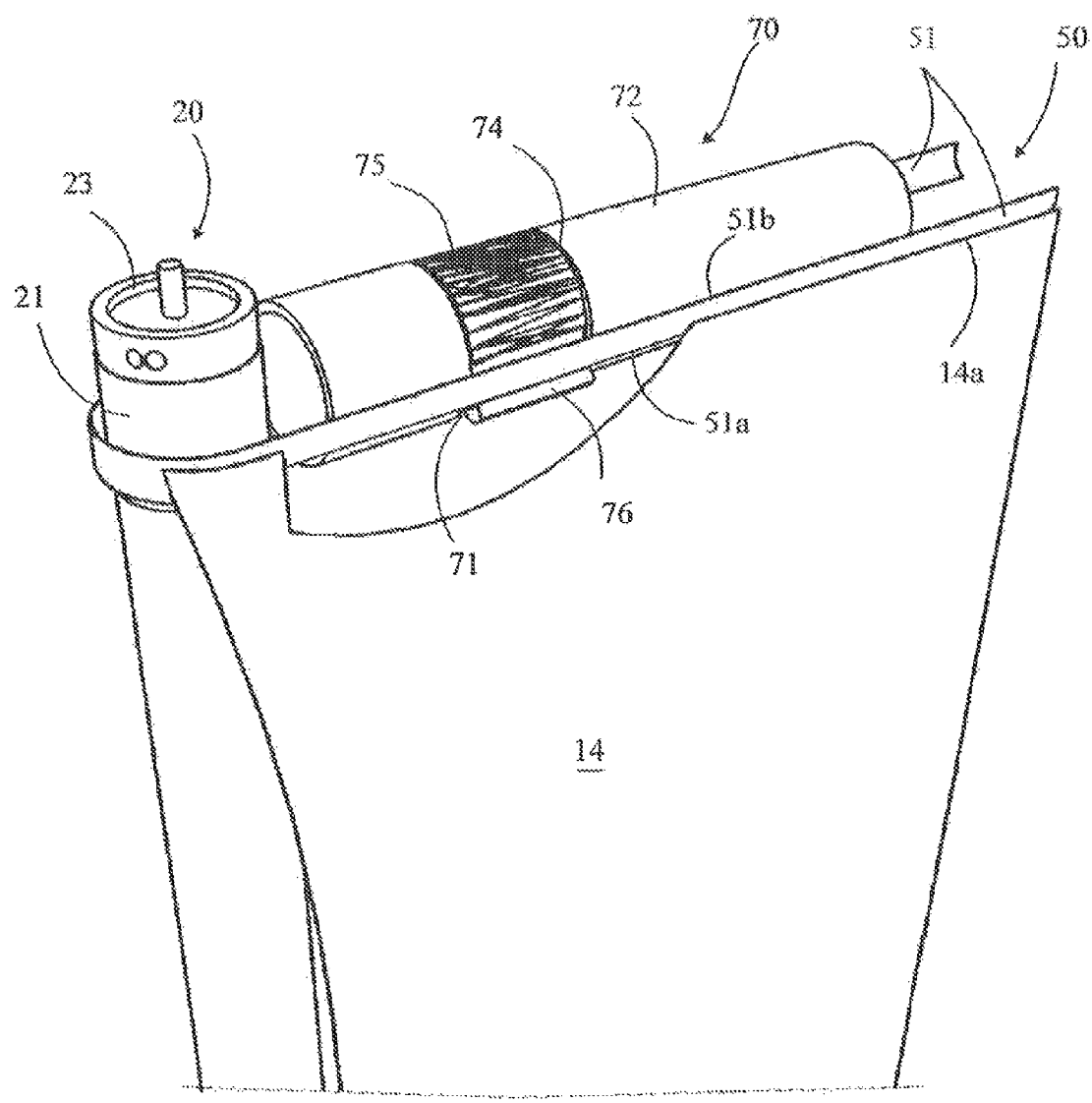
FIG. 6 is a partial perspective view showing a sheet driving roller carrying the projection screen and the wall setting, its stiffening means and its guide means.
Figures 7, 8:
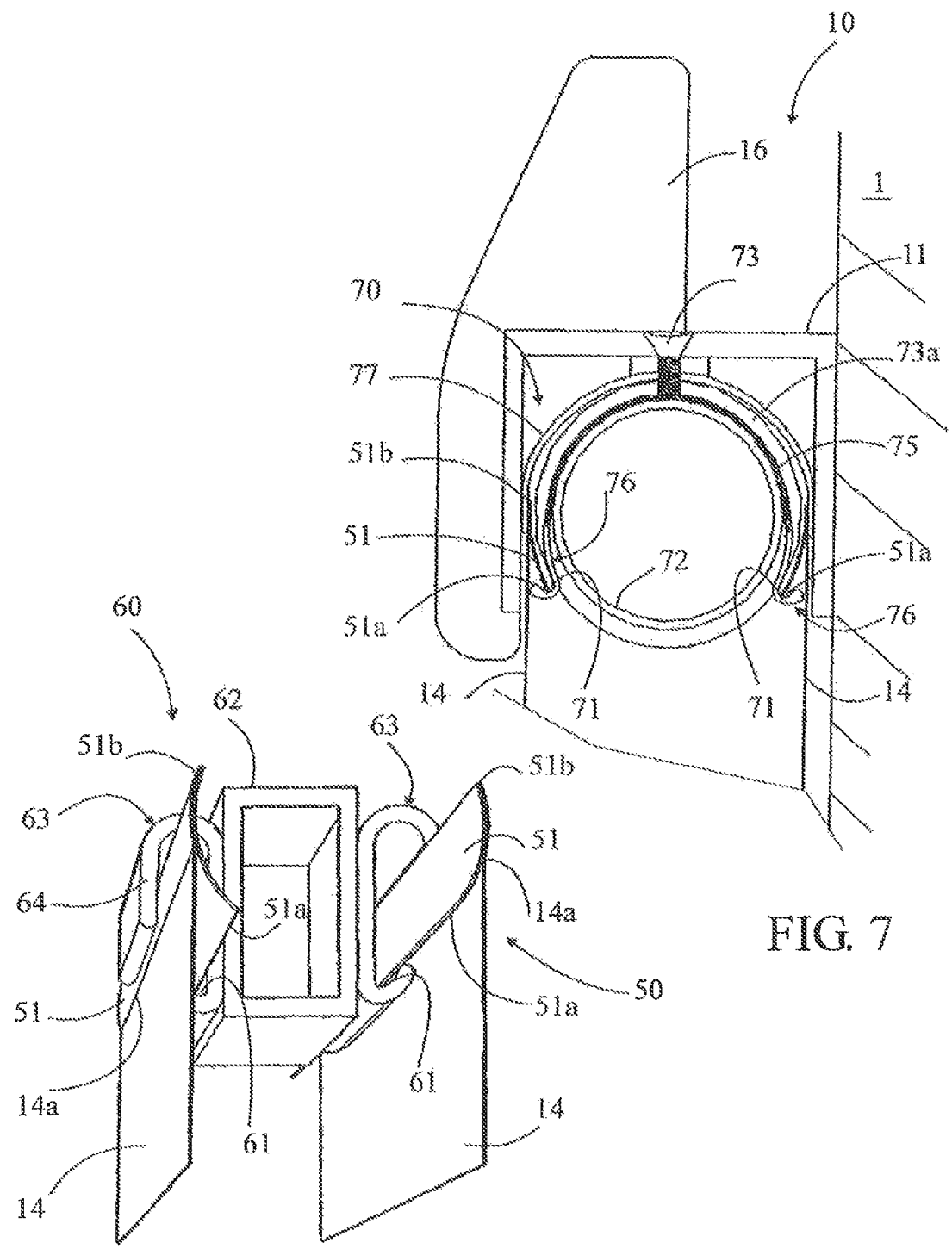
FIG. 7 is a partial end view of the stiffening means and of the guide means of FIG. 6.
FIG. 8 is a perspective view of an embodiment variant of the guide means of FIG. 6, FIGS. 9A, 9B and 9C are front views of the projection screen device according to a second variant of the invention, wherein the casing is telescopic and represented respectively in closed position and in open position, offering two screen sizes.
Figure 9A:
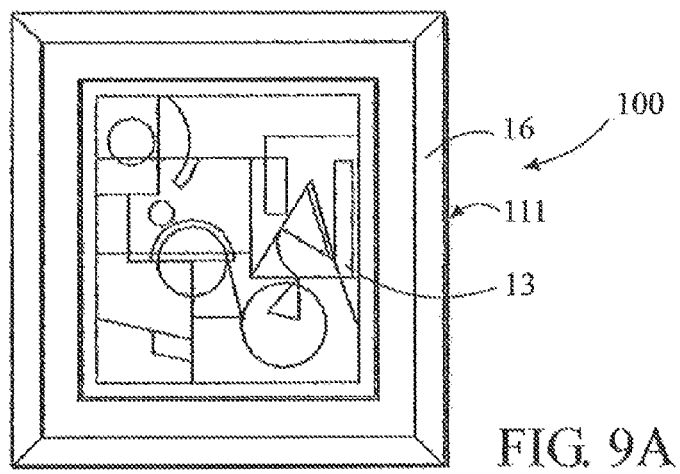
Figure 9B:
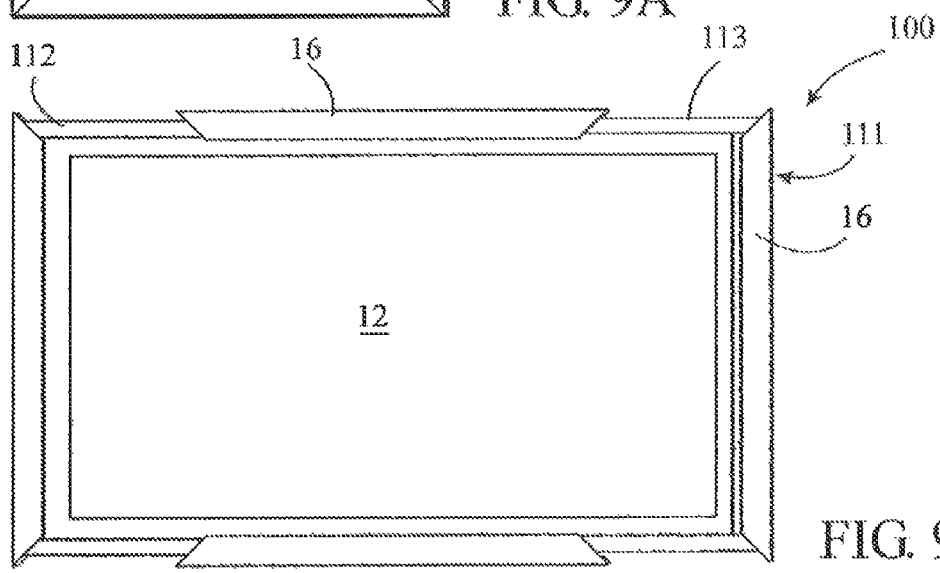
Figure 9C:
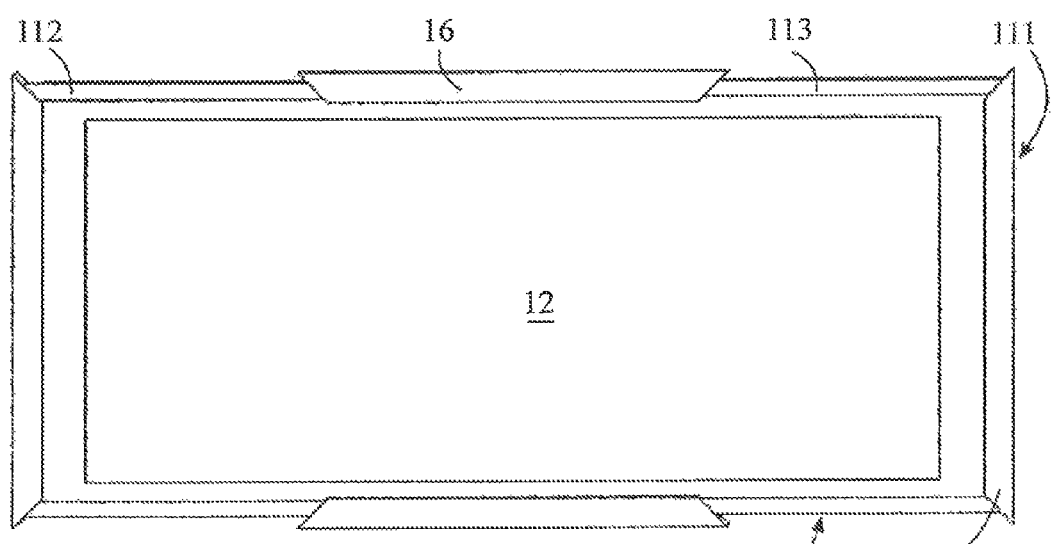

The screen device 10 according to the invention furthermore comprises stiffening means 50 associated with the two free edges 14a of support sheet 14 to stiffen them in the winding direction of said sheet and confer to the support sheet 14 a perfect flatness at least on the whole of its surface exposed on the font side of casing 11. Referring more specifically to FIGS. 6 to 8, these stiffening means 50 comprise a preferably metallic strap 51 out of spring steel, slightly curved or flat, fixed on the free edges 14a of support sheet 14. Strap 51 can be made out of any other material offering equivalent mechanical properties such as aluminum, aluminum alloy, stainless steel or any other steel or alloy, or also any suitable synthetic or composite material. This strap 51, which can be compared with a metallic measuring tape, has the advantage of being rigid in its length along its longitudinal axis X and in its width along its transversal axis Y, and flexible in its thickness so as to be able to flatten when it is curved, and to wind on itself in a small space, so that it winds up easily with carrier frame 14 on the winding rollers 21, 22 of FIG. 3, but also around the other rollers described referring to FIGS. 4 and 5, without generating an excess thickness that might lead to irreversible folds on support sheet 14. This strap 51 has a narrow width and a thickness that is negligible with respect to its length. Its length must be identical to that of support sheet 14. It is fixed on the free edges 14a of support sheet 14 in particular by gluing, using a cold glue, for example a flexible glue of the Patex® type, or by any other equivalent definitive fixing means compatible with the material of support sheet 14 and of strap 51. Strap 51 is partly fixed on support sheet 14, that is to say on a section only of its width, to let free its both longitudinal edges, which define a free inside edge 51a and a free outside edge 51b located on either side of the free edge 14a of support sheet 14. Of course, the free edge 14a of the sheet can coincide with the free outside edge 51b of strap 51. This strap 51 has the advantage of being neither extensible nor deformable in its length or in its width, ensuring a perfect mechanical resistance of free edges 14a of support sheet 14 and an induced tension of support sheet 14, therefore avoiding any crease, wave and other deformation of support sheet 14 that would be detrimental to the quality of support sheet 14 itself and to the projection quality it ensures, even on great lengths according to center distance E of rollers 21, 22. Moreover, this strap 51 can be wound on itself without fatigue or wear, offering a reliable and durable solution. Along center distance E, the straps 51 provided on both free edges 14a of support sheet 14 are sufficient to stretch support sheet 14 uniformly and permanently.

The screen device 10 according to the invention moreover comprises guide means 60 for the free edges 14a of support sheet 14 using the stiffening means 50 in order to prevent any transversal shift of support sheet 14 with respect to the winding rollers. An example is illustrated in reference to FIG. 8 and comprises longitudinal grooves 61 arranged to receive by sliding the inside edges 51a of straps 51. These longitudinal grooves 61 are carried by a supporting profile 62 mounted in casing 11 by any known means, such as fastening screws (not represented). In this example, supporting profile 62 is a hollow rectangular profile and grooves 61 are arranged in C-shaped guides 63 mounted on both sides of profile 62 to guide support sheet 14 as well on the front side of casing 11 as inside of casing 11. The upper loop of guide 63 is configured to hold upper side 51b of strap 51. The sliding of strap 51 is thus perfectly guided during the displacement of support sheet 14, ensuring a linear displacement and proper positioning of fabric 14. The guides 63 can preferably be made out of or coated with a material with a low coefficient of friction such as Teflon®. These guides 63 extend longitudinally between the two winding rollers 21, 22 to guide the lower and upper free edges 14a of support sheet 14. They can be continuous or discontinuous.

FIGS. 6 and 7 illustrate an embodiment variant of guide means 70 that allows, in addition to guiding the free edges 14a of support sheet 14, self-centering of this support sheet 14 in order to prevent any deviation during its displacements. They include longitudinal grooves 71 arranged to receive by sliding the inside edges 51a of straps 51. These longitudinal grooves 71 are carried by a supporting profile 72 mounted in casing 11 by any known means, such as fastening screws 73 holding brackets 73a. In this example, supporting profile 72 is a cylindrical hollow profile that delimits external locations 74 arranged to receive C-shaped elastic tapes 75 carrying at their ends guides 76 with the grooves 71. These guides 76 are arranged on either side of profile 72 to guide support sheet 14 as well on the front side of casing 11 as inside of casing 11. The fact that the front and rear guides 76 are connected together two by two by an elastic tape 75 allows balancing the tension between the section of support sheet 14 located at the front side of casing 11 and the section of support sheet 14 located inside casing 11, therefore allowing the auto-centering of support sheet 14. The guide means 70 are complemented with a semi-cylindrical external guide 77 located in casing 11 to hold the external edges 51b of straps 51. As previously, guides 76 and 77 can be made out of or coated with a material with a low coefficient of friction such as Teflon®. They extend longitudinally between the two winding rollers 21, 22 to guide the lower and upper free edges 14a of support sheet 14. They can be continuous or discontinuous.

The guide means 60 and 70 can be combined, for example mounting guide means 60 along one of the free edges 14a of support sheet 14 and the other guide means 70 along the other free edge. Likewise, other guide means 80 as the ones described in reference to FIG. 12 can integrate permanent tensioning means of support sheet 14. Of course, any other guide means can be suitable, such as castors, rollers or similar allowing guiding without friction the free edges 14a of support sheet 14.

FIGS. 9 to 12 illustrate another variant of the retractable screen device 100 according to the invention, wherein casing 111 is no more fixed and solid as in the previous example, but telescopic. This embodiment variant allows adapting the opening of casing 111 according to the use of screen device 100. In FIG. 9A, casing 111 is in closed position and shows to the user a setting 13 that can be a piece of art. In FIG. 9B, this casing 111 is in a first open position that can for example correspond to a 16:9 size screen and, in FIG. 9C, this casing 111 is in a second open position that for example correspond to a 2.25:1 size screen.

In this case, casing 111 is specific and is an integral part of screen device 100. To that purpose, casing 111 includes, in reference to FIGS. 10A and 10B, two end panels 112, 113 that carry the winding rollers 31, 32 of the driving means 30 of FIG. 4 for example, a bottom panel 114 and two intermediate stages formed by two sets of intermediate panels 115, 116. The end panels 112, 113 and the intermediate panels 115, 116 are mounted on telescopic rails or slides 118, preferably on balls or needles (represented in FIG. 11B), so as to be moved with respect to each other like a drawer. The intermediate panels 115, 116 can be replaced with slides 118. The two end panels 112, 113 are tensioned towards their open position by return means 117, 120 that tend to move them away from each other and they are held in closed position by motors 37, 38 coupled to said driving rollers 33, 34. In the example illustrated in FIGS. 10A and 10B, the return means 117 are represented by compression springs. In the example illustrated in FIGS. 11A and 11B, the return means 120 are represented by lozenge-articulated arms 121 that are tensioned in opening direction by return means 122 represented by dot-and-dash lines, such as for example compression springs, forming a type of pantograph. These return means 120 allow achieving a stable position also in closed position. Of course, any equivalent means may be suitable, such as spring jacks, gas springs or similar.

FIG. 10A shows screen device 100 in retracted position showing to the user for example a setting 13 on its support sheet 14. The intermediate panels 115, 116 are superimposed on end panels 112, 113 and on bottom panel 114, defining a first center distance E1 between the two parallel rollers 31, 32. As soon as the user commands the start of one of the motors 37 to replace his setting 13 with a projection screen 12, support sheet 14 unwinds from the corresponding driving roller 33, releases return means 117 and generates the opening of casing 111 in a way centered on its bottom panel 114. When the user sees projection screen 12 arrive, he commands the start of motor 38 to wind up setting 13 while going on unwinding projection screen 12 with motor 37. As soon as setting 13 has disappeared from the front side of casing 111, the user stops the corresponding motor 38 and continues opening projection screen 12 using motor 37 until it appears totally, and he then stops the corresponding motor 37. Casing 111 is in open or deployed position represented in FIG. 1 OB wherein the parallel rollers 31, 32 define a second center distance E2 that can be equal at least to 1.5 times the first center distance E1. This telescopic casing 111 allows deploying projection screens 12 with a size much larger than setting 13 and therefore reducing the space required on the wall or on the floor by screen device 100. This embodiment variant also allows displaying different sizes and/or different reflective qualities for projection screen 12, depending on whether support sheet 14 is unwound on a more or less important length between minimum center distance E1 and maximum center distance E2. Of course, this embodiment variant also includes stiffening means 50 associated to support sheet 14, as well as its guide means 60, 70 provided in particular in the end panels of casing Ill and on the front side of casing 111 by an unwinding guide system or similar. It goes without saying that the control of motors 37, 38 can be entirely automated with an electronic control unit and determined according to the screen type, which the operator can select with a remote control. Likewise, depending on the return means 117, 120 used, the opening of casing 111 can be achieved simply by releasing progressively the motor brake of motors 37, 38.

Other guide means 80 can be provided, such as those illustrated in FIGS. 11 and 12 and mounted on the rails or slides 118 in the upper and in the lower section of said screen device 100 so as to move simultaneously with the displacement of support sheet 14 when opening or closing said casing 111, in order to ensure a uniformly distributed guidance of free edges 14a of support sheet 14. Each of them includes a supporting plate 81 that is either mounted stationary on the end panels 112, 113, or sliding on slides 118, or stationary on additional slides 119. The mobile supporting plates 81 are connected together by small chains 82, twines or similar so as to move with a controlled center distance. The guide means 80 moreover include a C-shaped guide 83 that delimits a groove 84 to guide support sheet 14. The upper loop 85 of guide 83 is configured to hold upper side 51b of strap 51. This guide 83 is tensioned by return means 86 towards the outside of casing 111 in order to exert permanently a tension on support sheet 14 from the inside towards the outside of the sheet. To this purpose, this guide 83 is mounted between two profiles 87 fastened onto supporting plates 81 by screwing or similar and slidably guided on rods 88. In the example represented, the return means 86 are made of compression springs guided on rods 88. This way, strap 51 is perfectly guided while sliding during the displacement of support sheet 14, which is constantly tensioned. As in the previous examples, the guides 83 can be made out of or coated with a material with a low coefficient of friction such as Teflon®.

The embodiment variant according to FIGS. 9 to 12 allows integrating easily one or several projection screens 12 in a three-dimensional piece of art such as for example a sculpture forming a setting 13. In this case, if screen device 100 stands on the floor, casing 111 in its closed position, associated or not with a cover frame 16, as well as the underframe (not represented), can form said piece of art. Casing 111 can therefore have a three-dimensional shape that is not necessarily a parallelepiped. The opening of casing 111 generates the opening of the piece of art that shows support sheet 14 which, in this case, only comprises one or several projection screens 12, as the setting 13 is formed by the outside of said screen device 100.

Possibilities for Industrial Application:

This description shows clearly that the invention allows reaching the goals defined, that is to say a retractable projection screen device that is multifunctional, modulable and that can evolve by changing support sheet 14, with a simple and reliable design, easy to use, aesthetic and ergonomic, therefore allowing increasing the number of potential users of this home cinema technology, being specified that this device can have both domestic and professional applications. In particular for . professional purposes, the content of support sheet 14 can of course be modified according to the specification sheet and to the targeted customers, This content can for example include advertising, promotional, technical, commercial, etc. information.

The present invention is not restricted to the examples of embodiment described, but extends to any modification and variant which is obvious to a person skilled in the art while remaining within the scope of the protection defined in the attached claims.

The invention claimed is:

1. A retractable projection screen device (10, 100) comprising:
    at least one projection screen (12) and at least one setting (13) superimposed on the projection screen (12) in at least one retracted position,
    displacement means (20, 30, 40) associated respectively with at least one of the projection screen and with the setting for moving at least one of the projection screen (12) or the setting (13) with respect to the other in order to make the projection screen (12) visible in at least one position of use,
    the at least one projection screen (12) being carried by a support sheet (14),
    the displacement means (20, 30, 40) including at least two parallel winding rollers (21, 22; 33, 34; 43, 44) upon which the support sheet (14) winds up, and at least one of the winding rollers being a motorized driving roller, and
    a casing (11,111) being arranged to be hung on a wall (1) or carried by a carrier structure, and containing the displacement means (21 ,22; 33, 34; 43,44) and the support sheet (14),
    wherein the screen device (10, 100) includes stiffening means (50) associated with two free edges (14a) of the support sheet (14) to stiffen the two free edges (14a), at least in the winding direction of the support sheet (14), and confer a perfect flatness to the support sheet (14) over its entire surface, and
    the screen device (10, 100) also includes guide means (60, 70, 80) mounted to the casing (11, 111) and extended longitudinally between the at least two parallel winding rollers, and the guide means (60, 70, 80) are arranged to receive and guide the two free edges (14a) of the support sheet (14) via the stiffening means (50).

2. The screen device according to claim 1, wherein the stiffening means (50) include at least one strap (51) added on each of the two free edges (14a) of the support sheet (14), the at least one strap (51) is rigid in its length along a longitudinal axis (X) thereof and in its width along a transverse axis (Y) thereof, and the strap (51) is flexible so as to allow winding with the support sheet (14).

3. The screen device according to claim 2, wherein the strap (51) is partly fitted onto the two free edges (14a) of the support sheet (14) so that strap (51) has a free inside edge (51a) and a free outside edge (51b).

4. The screen device according to claim 3, wherein the free edge (14a) of the support sheet (14) coincide with the free outside edge (51b) of the strap (51).

5. The screen device according to claim 1, wherein the displacement means (20) includes the two parallel winding rollers (21, 22) of which at least one is a motorized driving roller (21), and the support sheet (14) forms a closed loop around the winding rollers (21, 22).

6. The screen device according to claim 1, wherein the displacement means (30, 40) includes the at least two parallel winding rollers (31, 32; 41, 42) and two driving rollers (33, 34; 43, 44), and the support sheet (14) forms an open loop and each of its ends winds up on one of the driving rollers (33, 34).

7. The screen device according to claim 6, wherein the support sheet (14) includes several projection screens (12) with at least one of different sizes, different reflective qualities or several setting (13) types placed one after the other.

8. The screen device according to claim 1, wherein the casing (111) is telescopic and includes at least one bottom panel (114) and at least two end panels (112, 113) which carry at least the two parallel winding rollers (31, 32) and the driving rollers (33, 34), the end panels (112, 113) are slidably mounted with respect to the bottom panel (114) so as to be able to move away from each other and increase a center distance of the winding rollers (31, 32), as well as a dimension of a visible section of the support sheet (14).

9. The screen device according to claim 8, wherein the casing (111) includes at least one additional stage made of at least two intermediate panels (115, 116) located between the bottom panel (114) and the end panels (112, 113) and slidably mounted with respect to each other.

10. The screen device according to claim 8, wherein at least the end panels (112, 113) are tensioned towards am open position by return means (117, 120) that tend to move the end panels (112, 113) away from each other and are held in a closed position by motors (37, 38) coupled to the driving rollers (33, 34).

11. The screen device according to claim 8, wherein the supports (81) of the guide means (80) are mounted on slides (118, 119) and arranged to follow the two free edges (14a) of the support sheet (14) during the opening and closing movements of the telescopic casing (111).

12. The screen device according to claim 1, wherein the casing (11, 111) comprises loudspeakers (15) and the support sheet (14) has micro-perforations at least in front of the loudspeakers, and the guide means comprises at least one of castors or rollers for guiding, without friction, the two free edges (14a) of the support sheet (14).

13. A retractable projection screen device (10, 100) comprising:
  at least on projection screen (12) and at least one setting (13) superimposed on the projection screen (12) in at least one retracted position;
  displacement means (20, 30, 40) associated respectively with at least one of the projection screen and with the setting for moving at least one of the projection screen (12) or the setting (13) with respect to the other in order to make the projection screen (12) visible in at least one a use position;
  the at least one projection screen (12) being carried by a support sheet (14);
  the displacement means (20, 30, 40) including at least two parallel winding rollers (21,22; 33, 34; 43, 44) upon which the support sheet (14) winds up, and at least one of the winding rollers being a motorized driving roller; and
  the screen device including a casing (11, 111) arranged to be hung on a wall (1) or carried by a carrier structure, and containing the displacement means (21, 22; 33, 34; 43, 44) and the support sheet (14);
  wherein the screen device (10, 100) includes stiffening means (50) associated with two free edges (14a) of the support sheet (14) for stiffening the two free edges (14a), at least in the winding direction of the support sheet (14), and confer a perfect flatness to the support sheet (14) over its entire surface;
  the screen device (10, 100) also includes guide means (60, 70, 80) mounted to the casing (11, 111) and arranged to guide the two free edges (14a) of the support sheet (14) via the stiffening means (50);
  the strap (51) is partly fitted onto the two free edges (14a) of the support sheet (14) so that strap (51) has a free inside edge (51a) and a free outside edge (51b); and
  the guide means (60, 70, 80) include longitudinal grooves (61, 71, 84) arranged to receive by sliding at least the inside edges (51a) of straps (51), and the longitudinal grooves (61, 71, 84) are carried by at least one support (62, 72, 81) mounted to the cashing (11, 111).

14. The screen device according to claim 13, wherein the longitudinal grooves (61, 71, 84) are arranged in guides (63, 76, 83) placed on the at least one support (62, 72, 81) to ensure the guidance of at least a visible section of the support sheet (14).

15. The screen device according to claim 14, wherein the guides (83) are mounted movably on supports (81) and tensioned by a return means (86) in order to stretch the support sheet (14).

16. The screen device according to claim 13, wherein the longitudinal grooves (61, 71) are arranged in guides (63, 76) placed on the at least one support (62, 72) to ensure the guidance of a visible section as well as of a retracted section of the support sheet (14).

17. The screen device according to claim 16, wherein the guides (76) arranged on either side of the at least one support (72) are connected two by two by an elastic tape (75) arranged to balance tension between the visible section of the support sheet (14) and the retracted section of the support sheet (14), and self-center the support sheet (14).

* * * * *